(12) United States Patent
Vandebeuque

(10) Patent No.: US 9,103,675 B2
(45) Date of Patent: Aug. 11, 2015

(54) RESONATOR WITH A PARTIAL METAL-PLATED LAYER

(75) Inventor: Paul Vandebeuque, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 115 days.

(21) Appl. No.: 13/503,767

(22) PCT Filed: Nov. 10, 2010

(86) PCT No.: PCT/EP2010/006834
§ 371 (c)(1),
(2), (4) Date: Apr. 24, 2012

(87) PCT Pub. No.: WO2011/057767
PCT Pub. Date: May 19, 2011

(65) Prior Publication Data
US 2012/0204641 A1  Aug. 16, 2012

Related U.S. Application Data

(60) Provisional application No. 61/325,075, filed on Apr. 16, 2010.

(30) Foreign Application Priority Data

Nov. 12, 2009 (FR) ...................................... 09 05424

(51) Int. Cl.
*G01C 19/5783* (2012.01)
*G01C 19/5691* (2012.01)

(52) U.S. Cl.
CPC ................................. *G01C 19/5691* (2013.01)

(58) Field of Classification Search
USPC ........................................................ 73/504.13
See application file for complete search history.

(56) References Cited

U.S. PATENT DOCUMENTS

| 6,474,161 | B1* | 11/2002 | Jeanroy et al. | 73/504.13 |
|---|---|---|---|---|
| 6,647,785 | B2* | 11/2003 | Stewart et al. | 73/504.13 |
| 6,945,109 | B2* | 9/2005 | Renault et al. | 73/504.13 |
| 7,010,977 | B2* | 3/2006 | Renault | 73/504.13 |
| 7,127,946 | B2* | 10/2006 | Renault | 73/504.13 |
| 7,127,947 | B2* | 10/2006 | Renault | 73/504.13 |
| 7,607,350 | B2* | 10/2009 | Choi | 73/504.13 |
| 7,694,595 | B2* | 4/2010 | James et al. | 74/5 R |
| 8,210,041 | B2* | 7/2012 | Ragot | 73/504.12 |
| 2003/0019296 | A1* | 1/2003 | Stewart et al. | 73/504.08 |
| 2004/0154396 | A1* | 8/2004 | Renault et al. | 73/504.01 |
| 2010/0083758 | A1* | 4/2010 | Vandebeuque et al. | 73/504.13 |
| 2011/0290021 | A1* | 12/2011 | Horning et al. | 73/504.13 |

\* cited by examiner

*Primary Examiner* — Hezron E Williams
*Assistant Examiner* — Mark A Shabman
(74) *Attorney, Agent, or Firm* — Muncy, Geissler, Olds & Lowe, P.C.

(57) ABSTRACT

A hemispherical resonator includes a bell fastened to a base. The base carries a main electrode extending facing an annular edge of the bell, and at least one guard electrode adjacent to the main electrodes. An electrically conductive layer covers at least part of the inside surface, the annular edge of the bell, and covers a portion of an outside surface of the bell adjacent to the annular edge thereof.

7 Claims, 2 Drawing Sheets

U.S. Patent    Aug. 11, 2015    Sheet 1 of 2    US 9,103,675 B2
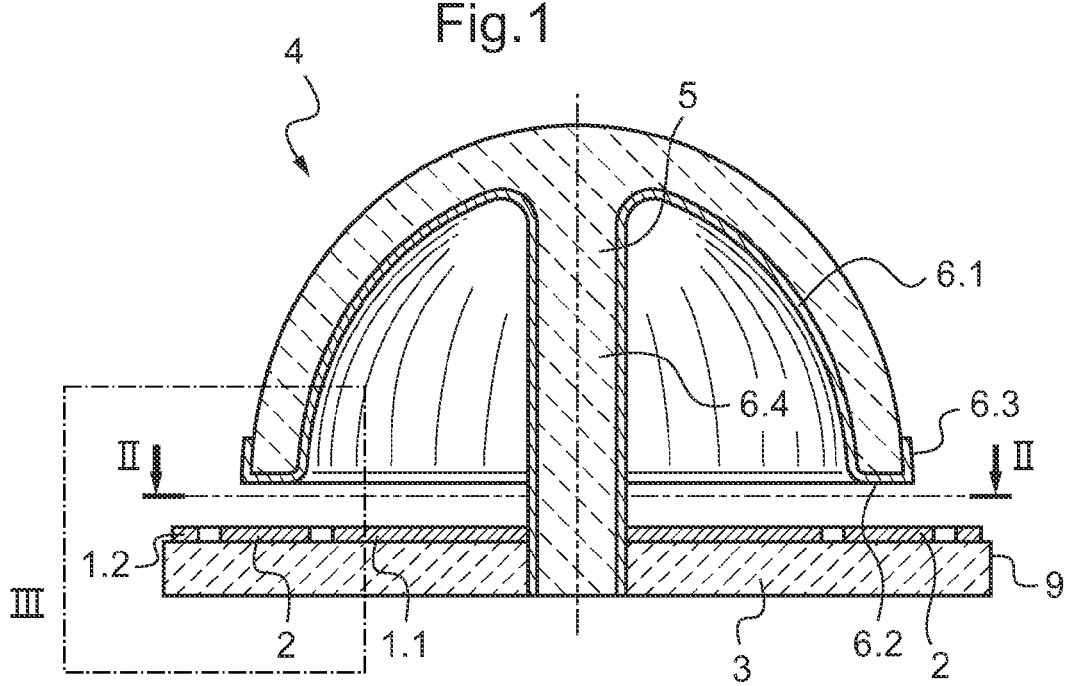
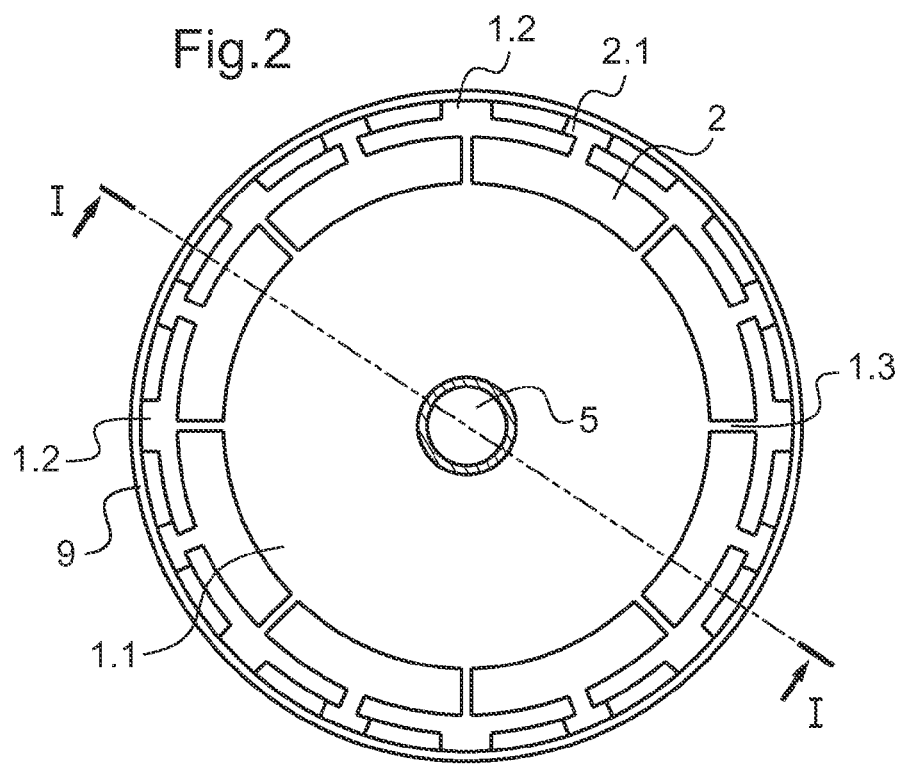

RESONATOR WITH A PARTIAL METAL-PLATED LAYER

CROSS REFERENCE TO RELATED APPLICATIONS

This non-provisional application claims priority of U.S. Provisional Application No. 61/325,075 filed on 16 Apr. 2010 under 35 U.S.C. §119(e), the entire contents of all of which are hereby incorporated by reference.

The present invention relates to a hemispherical resonator, in particular for making a vibrating angular sensor such as a gyro.

BACKGROUND OF THE INVENTION

Document FR-A-2 851 040 discloses a hemispherical resonator having a vibrating member in the form of a bell fastened by a stem to a base that has main electrodes facing the edge of the bell, and a guard electrode adjacent to the main electrodes.

The main electrodes serve firstly to cause the bell to be set into vibration by applying at least one alternating voltage to the main electrodes while maintaining the bell at a constant potential, and secondly to detect vibration of the bell by picking up a detection signal from the main electrodes.

The guard electrode may be used either for its usual function by connecting it to ground, thereby serving to reduce crosstalk between the electrodes, or it may be used as a control and/or detection electrode by applying appropriate signals to each of the portions of the guard electrode.

In such embodiments, the bell is made of silica, which acts as an electrical insulator. The inside surface and the edge of the bell, and the stem are covered in a layer of metal.

Document US-A-2003/0019296 discloses a resonator in form of a bell of silica having an inside surface and an outside surface both fully covered by a conductive metal coating.

Since the metal plating close to the edge of the bell tends to damp its vibration, thereby worsening drift, proposals have been made to leave the silica bare on the outside surface of the bell.

It is known for example from document U.S. Pat. No. 6,474,161 a hemispherical resonator comprising a vibrating member in the form of a bell of silica partially covered by a conductive metal coating. The conductive metal coating covers a plane annular edge of the bell and forms conductive tracks extending on an inside surface of the bell between a pole of the resonator and said edge. The outside surface of the bell is left completely uncovered.

It is also know from document US-A-2004/0154396 such a resonator in which the inside surface of the bell is fully covered by the conductive metal coating.

Nevertheless, it has been found that leaving the silica bare on the outside surface of the bell adjacent to the edge thereof gives rise to a modification in the looked-for electrical image and thus gives rise to an error in angle measurement. This modification comes from field lines that move between the electrodes and the metal-plated and biased zones of the resonator by passing through the silica, thereby causing charge to migrate very slowly in the silica which is not infinitely insulating, and until potential equilibrium is reached. Consequently, the field lines and thus the electrostatic efficiency are transformed over time. Such variation over time is very difficult to correct by calculation.

OBJECT OF THE INVENTION

In the context of prolonged use of a resonator as defined above, it would appear to be desirable to minimize measurement errors of angular type and to limit the damping of vibration in the device so as to obtain a measuring instrument that is accurate and reliable over time.

BRIEF DESCRIPTION OF THE INVENTION

The invention concerns a hemispherical resonator comprising a bell fastened to a base that carries main electrode extending facing an annular edge of the bell, and at least one guard electrode adjacent to the main electrodes, an electrically conductive layer covering at least part of the inside surface of said annular edge of the bell, wherein the electrically conductive layer covers a portion of an outside surface of the bell adjacent to the annular edge thereof.

The present invention thus proposes not only deflecting the field lines situated on either side of the edge of the bell as much as possible towards a guard electrode, but also to minimize angular error by applying an electrically conductive layer that covers at least part of the inside surface, the annular edge, and a portion only of the outside surface of the bell adjacent to its annular edge. Furthermore, in order to minimize absorption of the vibration to which the bell is subjected, the electrically conductive layer should be of a thickness that is just sufficient to ensure that it is conductive. Since the absorption of vibration is related directly to the thickness of the electrically conductive layer, the finer the layer the smaller the damping of the vibration to which the bell is subjected. In addition, the variation in the charge of the resonator is no longer sensed by the main electrodes but by the guard electrode so the gain of the main electrodes is no longer affected by this variation of charge. This also makes it possible to reduce the progressive migration of charge towards the silica over the fraction of the outside surface of the bell that is adjacent to the annular edge thereof. The hemispherical resonator of the invention is thus improved from the point of view of accuracy of measurement and the stability of its performance over time.

In an advantageous embodiment of the invention, the guard electrode, connected to ground, comprises a central portion extending inside the main electrodes together with at least one peripheral portion extending outside the main electrodes, with connection portions extending between the main electrodes to connect the central portion to the peripheral portion.

This embodiment is particularly effective.

BRIEF DESCRIPTION OF THE DRAWINGS

Other characteristics and advantages of the invention appear on reading the following description of a particular embodiment of the invention described with reference to the accompanying figures, in which:

FIG. 1 is an axial section view of the hemispherical resonator on line I-I of FIG. 2;

FIG. 2 is a plan view of the main and guard electrodes of the resonator in section on line II-II of FIG. 1.

DETAILED DESCRIPTION OF THE INVENTION

Figure 3:
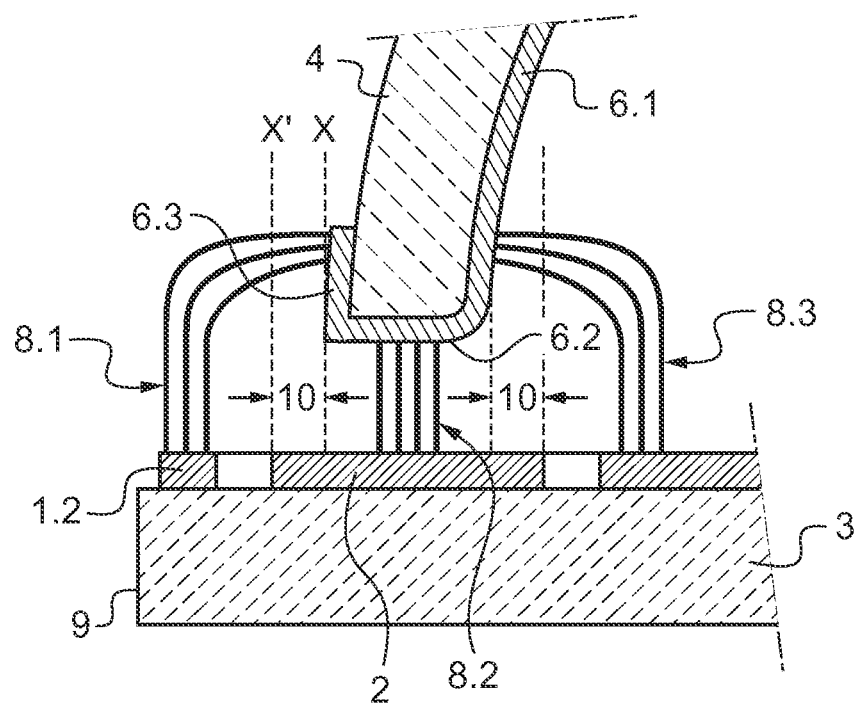
FIG. 3 is an axial section view of the hemispherical resonator, and more particularly an enlarged view of section III of FIG. 1.

In the embodiment shown in FIG. 1, the hemispherical resonator comprises a bell 4 of silicon-based material fastened to a base 3 by a stem 5.

Main electrodes 2 are provided on the base 3 facing the annular edge 6.2 of the bell 4 and are connected to an electronic control unit (not shown) to constitute detection and excitation means co-operating with the resonator.

A guard electrode, connected to ground, is also provided on the base 3. The guard electrode has a central portion 1.1 extending inside the main electrode 2, peripheral portions 1.2 in annular segments extending outside the main electrodes 1.1, and connection portions 1.3 each extending between two adjacent main electrodes 1.1 to connect the central portion 1.1 to one of the peripheral portions 1.2. The guard electrode serves to reduce crosstalk between the electrodes, as described in document FR-A-2 851 040.

An electrically conductive layer extends over the inside surface 6.1, the annular edge 6.2, and a portion of the outside peripheral 6.3 of the bell 4. Said portion of the outside surface 6.3 of the bell is adjacent to the annular edge 6.2. As an example, said portion of the outside surface 6.3 of the bell adjacent to the annular edge 6.2 thereof has an height less than 1 millimeter.

In certain embodiments, the surface of the stem 6.4 may also be covered, and the inside surface of the bell may be covered partially or in full. This electrically conductive layer is also connected to the control unit in a manner that is itself known.

FIG. 2 is a plan view of the base covered by the main and guard electrodes shown in section on line II-II of FIG. 1, and showing more particularly the arrangement of these various components. This arrangement serves in particular to deflect field liens 8.1 and 8.3, shown in FIG. 3, that are situated on each side of the edge of the bell as much as possible towards a guard electrode 1.1 or 1.2. As mentioned above, the guard electrode has a central portion 1.1 extending inside the main electrodes 2 and provides a housing for receiving the base of the stem 5, together with peripheral portions 1.2 extending outside the main electrodes 2 with connection portions extending between the main electrodes 2 to connect the central portion to the peripheral portion.

Each main electrode 2 has a T-shaped portion 2.1 extending towards the margin 9 of the base between the peripheral portions of the guard electrode 1.2 in a regular alternation.

Manifestly, and regardless of the arrangement adopted, the main electrodes 2 and the guard electrode are separated by spaces for isolating them from one another (these spaces being represented by simple lines in the figures).

FIG. 3 shows the operation of the hemispherical resonator of the invention. The field lines are shown diagrammatically in this Figure by way of example for the purpose of understanding the invention. The field lines 8.2 situated between the annular edge 6.2 of the bell 4 and the main electrode 2 enable the measurements to be taken that are necessary for proper operation of the hemispherical resonator. The field lines 8.1 and 8.2 situated on either side of the annular edge 6.2 of the bell are deflected towards different portions of the guard electrode. In known manner, the field lines 8.3 situated at the inside surface 6.1 of the bell are deflected towards the central portion of the guard electrode 1.1, and in accordance with the invention, the field lines 8.1 situated on the outside surface 6.3 of the bell 4 are deflected towards the peripheral portion 1.2 of the guard electrode.

As mentioned above, the electrically conductive layer covering the bell 4 of the invention damps the vibrations of the device, which vibrations provide data that is essential for the operation of the resonator. That is why the thickness of this layer should be as thin as possible while nevertheless retaining its properties as a conductor of electricity.

By way of numerical example:
the height between the annular edge 6.2 of the bell 4 and the main electrode 2 is 80 micrometers (μm);
the substantially constant space between the main electrodes and the guard electrode is 50 μm wide;
the thickness of the electrically conductive layer lies in the range 1 nanometer (nm) to 10 nm;
the height of the portion of the outside surface 6.3 of the bell 4 adjacent to the annular edge 6.2 thereof is less than 1 millimeter (mm); and
the projection 10 of the main electrode 2 relative to the annular edge 6.2 of the bell along the axes X and X' parallel to a center axis of the bell is less than 1 mm on either side of the main electrode.

Naturally, the invention is not limited to the embodiment described above and modifications may be made thereto by the person skilled in the art without going beyond the ambit of the invention as defined by the claims.

The above-mentioned dimensions are given as an example and can be modified to be adapted for example to the dimensions of the resonator, and/or to the materials of the resonator and/or of the conductive layer, and/or to the electrical parameters of the resonator.

What is claimed is:

1. A hemispherical resonator comprising a bell having an inside surface, an outside surface and an annular edge comprising an annular planar surface extending between the inside surface and the outside surface of the bell, the bell being fastened to a base that carries main electrode extending facing the annular edge of the bell, and at least one guard electrode adjacent to the main electrodes, an electrically conductive layer covering at least part of the inside surface and said annular edge of the bell, wherein the electrically conductive layer covers a portion of the outside surface of the bell adjacent to the annular edge thereof.

2. A resonator according to claim 1, wherein the bell is made of silicon-based material.

3. A resonator according to claim 1, wherein said portion of the outside surface of the bell adjacent to the annular edge thereof has an height less than 1 millimeter.

4. A resonator according to claim 1, wherein the guard electrode comprises a central portion extending inside the main electrodes, at least one peripheral portion extending outside the main electrodes, and connection portions extending between the main electrodes to connect the central portion to the peripheral portion.

5. A resonator according to claim 4, wherein each main electrode has a portion extending towards the margin of the base between the elements of the peripheral portion of the guard electrode in a regular alternation.

6. A resonator according to claim 5, wherein:
a height between the annular edge of the bell and the main electrode is 80 micrometers (μm);
a substantially constant space extends between the main electrodes and the guard electrode and is 50 μm wide;
a thickness of the electrically conductive layer lies in the range 1 nanometer to 10 nanometers;
a height of the portion of the outside surface of the bell adjacent to the annular edge thereof is less than 1 millimeters (mm); and
a projection of the main electrode relative to the annular edge of the bell along a center axis of the bell is less than 1 mm on either side of the main electrode.

7. A resonator according to claim 1, wherein the outside surface of the bell is a hemispherical surface.

* * * * *